(12) United States Patent
Schaefer-Lorinser

(10) Patent No.: US 6,662,151 B1
(45) Date of Patent: Dec. 9, 2003

(54) SYSTEM FOR SECURED READING AND PROCESSING OF DATA ON INTELLIGENT DATA CARRIERS

(75) Inventor: Frank Schaefer-Lorinser, Ober-Ramstadt (DE)

(73) Assignee: Deutsche Telekom AG, Bonn (DE)

( * ) Notice: Subject to any disclaimer, the term of this patent is extended or adjusted under 35 U.S.C. 154(b) by 0 days.

(21) Appl. No.: 09/403,939

(22) PCT Filed: Apr. 15, 1998

(86) PCT No.: PCT/EP98/02205

§ 371 (c)(1),
(2), (4) Date: Oct. 29, 1999

(87) PCT Pub. No.: WO98/50894

PCT Pub. Date: Nov. 12, 1998

(30) Foreign Application Priority Data

May 2, 1997 (DE) .......................................... 197 18 547

(51) Int. Cl.[7] ................................................. G06F 1/24
(52) U.S. Cl. .................... 703/185; 713/200; 713/201
(58) Field of Search ............................... 713/201, 200, 713/185

(56) References Cited

U.S. PATENT DOCUMENTS 4,825,052 A    4/1989  Chemin et al.

FOREIGN PATENT DOCUMENTS

| DE | 41 19 924   | 12/1992 |
| EP | 0 231 702   | 8/1987  |
| EP | 0 588 339   | 3/1994  |
| GB | 2 154 344   | 9/1985  |
| WO | WO 91 16691 | 10/1991 |
| WO | WO 95 22125 | 8/1995  |

OTHER PUBLICATIONS

* Beutelspacher, A., *Kryptologie*, 1997, 5th Ed., Chapter 4, pp. 92–123.

* "Elektronisches Geld," Funkschau, No. 25, 1996, pp. 60–63.

*Primary Examiner*—Thomas R. Peeso
(74) *Attorney, Agent, or Firm*—Kenyon & Kenyon

(57) ABSTRACT

A system for the secure reading and processing of data on intelligent data carriers, such as chipcards, is described. Process executable in this system, in which the stored data and the authorizations or values associated with the data are especially well protected against access by unauthorized persons are also described. This is achieved by a useful combination of encryption processes. In particular, the risk involved with the spying out of master keys stored in autonomously operating terminals, such as vending machines or cardphones, is eliminated or at least reduced, thus counteracting the misuse of cash-reloadable chipcards increasingly used today.

16 Claims, 2 Drawing Sheets

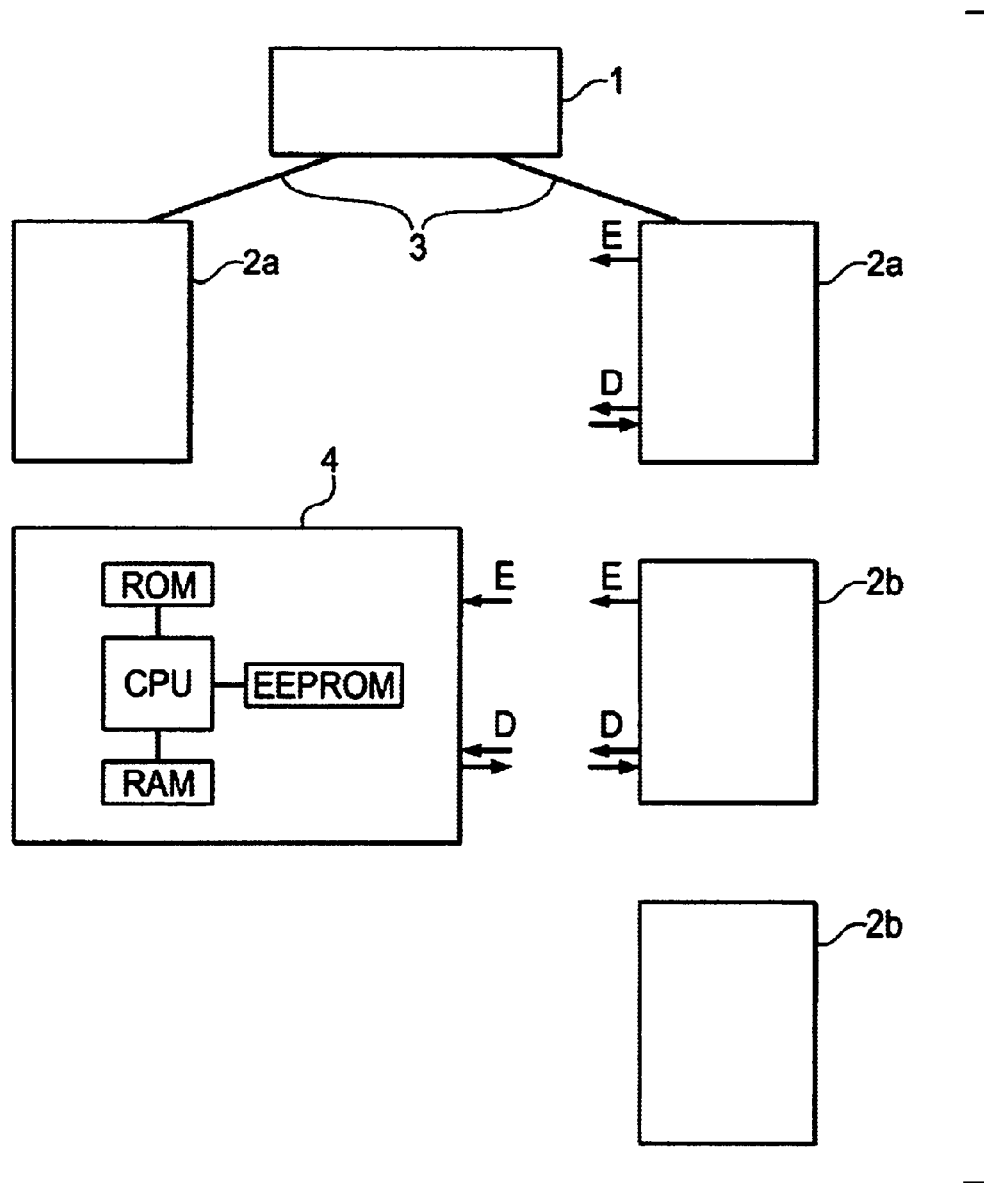

| Chipcard | Transfer | Terminal |
|---|---|---|
| Certificate: $S_{glob}$ (ID-No., $V_{card}$, $T_{val}$) $K_{auth}$, $K_{red}$, $S_{card}$, name, amount, sequence number, optional further information | | $V_{glob}$, $KM_{auth}$, $KM_{red}$ |
| | Certificate ⇒ | |
| | | Verifying of certificate with $V_{glob}$, temporary storage of $V_{card}$ and ID number, generating a random number $R_1$ |
| | ⇐ $R_1$ | |
| Creating a cryptogram: $e1 = K_{auth}$ (ID No., $R_1$, amount, further info), generating of $R_2$ | | Calculating of $K_{auth}$ from $KM_{auth}$ and ID number, and $K_{red}$ from $KM_{red}$ and ID number |
| | $e_1$, $R_2$ ⇒ | |
| | | Decryption of $e_1$ with the aid of $K_{auth}$, determining whether debiting is possible, creating a cryptogram $e_2 = K_{red}$ (debit amount, $R_2$), generating $R_3$ |
| | ⇐ $e_2$, $R_3$ | |
| Decryption of $e_2$ with the aid of $K_{red}$, carry out debiting, create posting data record $D_B$, calculate electronic signature with $S_{card}$: $e_3 = S_{card}$ (ID number, $D_B$, $R_3$) | | |
| | $e_3$ ⇒ | |
| | | Check the electronic signature by decryption with temporarily stored $V_{card}$. If signature and posting data OK, delete $V_{card}$ and ID number; output goods, ticket, etc. |

Fig. 2

SYSTEM FOR SECURED READING AND PROCESSING OF DATA ON INTELLIGENT DATA CARRIERS

FIELD OF THE INVENTION

The present relates to a system for the secure reading and processing of data on intelligent data carriers, as well as to processes executable in this system.

BACKGROUND INFORMATION

A system for the secure reading and processing of data on intelligent data carriers is described, for example, in "Kryptologie"(Cryptology) by A. Beutelspacher, 5th edition, Chapter 4, published in 1997 by Vieweg-Verlag (Vieweg Publishing House), Braunschweig/Wiesbaden, and is assumed as known. In particular, the challenge and response process described therein in connection with FIG. 4.12 on p. 93 and FIG. 4.16 on p. 101, and based on symmetrical encryption is suitable for the authentication of intelligent data carriers vis-à-vis computers or their input terminals.

Some conventional systems are also already known which employ asymmetrical key processes or a plurality of symmetrical or asymmetrical key processes in succession (see, e.g., "Funkschau" 1996, No. 25, pp. 60–63). However, asymmetrical key processes,.such as the RSA algorithm described in the krytologie, have the disadvantage as compared with symmetrical processes that, because of the need to carry out arithmetic operations with very large numbers, they are relatively slow and, if used for the authentication of the individual data carriers, require many keys to be stored in each terminal or, in the case of an existing data link to a central storage, to be stored in that storage.

The intelligent data carriers used in such systems, e.g., IC cards equipped with processors and storage devices, today usually referred to as chipcards, which often contain highly sensitive data, such as access authorizations to secure areas or the permission to withdraw amounts of money from an account, are largely secure against unpermitted use, unauthorized readout and intentional falsification of the stored data thanks to the use of the aforementioned cryptographic processes. The same is also true of the reloadable "electronic purses"(e.g., paycards, cashcards), increasingly used nowadays, from which amounts of money can be debited to pay for goods or services, at least if the terminals at which the withdrawals are made have a link to a computer center through which it is possible to retrieve a key that is stored therein and is required for the authentication of a data carrier, or if a cryptogram, transmitted from a data carrier for authentication, can be forwarded to the computer center for verification.

However, the latter is not always the case, because data links for public cardphones, transport-ticket machines, car-park ticket machines or vending machines are too costly. In such cases, a key required for security-critical operations is usually stored in the terminal, inside a so-called security module. This key is normally a master key which is used to calculate the key that is required for the respective data carrier to be processed and that matches its individual key, this involving the use of information, such as the chipcard number, which is specific to the data carrier and is transmitted from the data carrier.

The fact that this master key is located in a terminal in an insecure environment compromises the security of the entire system, because, if it became known to a criminal, that criminal would then be able to make unauthorized duplicates of all the data carriers used in the system.

SUMMARY

An object of the present invention is to exclude or at least to reduce such a risk and thereby to increase the security of the system.

By storing on the data carrier a second key pair satisfying an asymmetrical key algorithm, it is possible at the end of a data readout or processing operation to confirm the operation by an "electronic signature." The calculation and verification of the electronic signature require the key pair stored on the data carrier, and cannot be achieved simply by a key derived from the master key of a terminal and reproduced on the data carrier.

One example embodiment of the present invention makes it possible to verify that the individual data carriers belong to the system using an asymmetrical key process, without, however, having the disadvantages of an asymmetrical key process, as would result, for example, if secret keys for all data carriers were stored at a central location. Furthermore, in this case, the correctness of the key pair stored on the data carrier and used for generating the electronic signature is co-certified by the system. The secret key used for generating the certificate remains in the computer center and is therefore safe from outside access.

Other example embodiments of the present invention use of a key process employing a symmetrical key algorithm for the authentication of the data carriers vis-à-vis a terminal. The derivation of the keys, used for the authentication of the individual data carriers, from a master key dispenses with the need for the online connection of all terminals to the computer center or for the storage of extensive key lists in the terminals. In another example embodiment of the present invention, the storage and/or calculation on the data carrier of the key used for authentication permit adaptation of the authentication operation to the technical possibilities (computing and storage capacity) of the data carriers used.

In yet another example embodiment of the present invention, a further key usable in a symmetrical key process is provided.

In another example embodiment of the present invention, relate to measures aimed at better monitoring of monetary transactions in the case of data carriers used as electronic purses are provided.

Exemplary embodiments of the system according to the present invention and of processes carried out in this system for the readout and processing of the data stored on data carriers shall now be described with reference to two figures.

BRIEF DESCRIPTION OF THE DRAWING

FIG. 1 shows schematically the example hardware of a system according to the present invention.

FIG. 2 shows a flow chart relating to the secure modification of the data on a data carrier of a system developed according to an example embodiment of the present invention.

DETAILED DESCRIPTION

FIG. 1 shows a computer center 1 which is connected by data lines to input devices (terminals) 2a of a first type. Terminals 2b of a second type do not have a permanent connection to the computer center, but like the terminals of the first type, are able to communicate with data carriers 4 belonging to the system. For this purpose, the data carriers are inserted by the respective user into an appropriate slot on a terminal and are thereby connected via a power-transfer interface E to the power supply of the terminal, and via a data interface D to a computer system in the terminal. Power and data may be transferred in a conventional manner via electrical contacts, inductively or optically. Data carrier 4 itself, for example an IC card or chipcard, is equipped with a complete microcomputer system containing a processor CPU and various storage devices ROM, RAM, EEPROM.

The data carriers may perform different, really even a plurality of various functions. For example, this may be an ID function, in which data stored on the data carrier allows the user access to a secure area or grants the user permission to carry out a specific action. In the case of a check card, the stored data, possibly in combination with a secret number to be entered by the user, authorizes the user to make a withdrawal from an account. In the aforementioned cases, for data evaluation, use of terminals having a permanent data link to the computer center may be made, this making it possible for the keys required for the safeguarding of data against tampering or unauthorized readout to be kept in readiness at a central, protected location.

However, data carriers in chipcard format are also suitable for acting as electronic purses which, when loaded with an amount of money, can be used to pay for goods or services. While in this case, loading or reloading is carried out at special terminals connected to the computer center, e.g., a bank, the withdrawal of amounts can also take place at vending machines, cardphones, public-transport ticket machines or carpark ticket machines which are in the form of terminals belonging to the system, but are not connected to the computer center.

At such terminals, the transfer of a key or of encrypted data to or from the computer center is not possible, and the terminal, without the support of the computer center, must detect whether a data carrier belongs to the system, whether an amount of money stored on the data carrier is sufficient for a desired withdrawal and whether an effected withdrawal is correctly implemented on the data carrier.

FIG. 2 shows an example for the sequence of a withdrawal operation on a chipcard, in the form of an electronic purse, at a terminal which is not connected to the computer center.

In this case, the uppermost section of the diagram contains the data used to safeguard the operation and stored on the chipcard and in the terminal, respectively, prior to the transaction. The sections below show in chronological sequence the operations which take place on the chipcard (in the left-hand column), the transfers taking place between the chipcard and the terminal (in the center column) and the operations proceeding in the terminal (in the right-hand column).

Before being issued to a user, the chipcard was provided by the computer center with a certificate, a cryptogram generated using an asymmetrical key process, e.g., the known RSA algorithm, and representing an electronic signature. The cryptogram was generated with the aid of the signature function $S_{glob}$, available only in the computer center, of a global key pair $S_{glob}$, $V_{glob}$—said global key pair $S_{glob}$, $V_{glob}$ satisfying the indicated asymmetrical key algorithm—and, in addition to an identification number (ID number) uniquely identifying the chipcard and an indication of the period of validity $T_{val}$, contains the verification function $V_{card}$ of a card-specific key pair, this card-specific key pair enabling the chipcard to generate electronic signatures according to a further asymmetrical key process. The associated signature function $S_{card}$ is likewise stored on the card and remains thereon. In addition, a storage device on the chipcard contains further card-specific keys $K_{auth}$, $K_{red}$, used to carry out symmetrical key processes such as DES (Data Encryption Standard), Triple DES or IDEA, as well as further information such as the name of the user, the amount of money stored and a sequence number indicating the number of withdrawals made.

The key $V_{glob}$, required to verify the certificates of the system chipcards, and two master keys $KM_{auth}$ and $KM_{red}$ are stored in all terminals belonging to the system. From the master keys, the terminals are able, by linking these keys to the identification numbers of the respective cards to be processed, to reproduce the keys $K_{auth}$ and $K_{red}$ that are stored on the cards and are used to carry out symmetrical key processes.

If the chipcard is now brought into contact with a terminal, as soon as this is detected by the card, e.g., by the application of a supply voltage, the certificate is transferred to the terminal. If the terminal possesses the global key $V_{glob}$, then its computer is able to verify the certificate, and in so doing learns the identification number of the card, the validity of the card and the verification function $V_{card}$. The identification number and $V_{card}$ are temporarily stored by the terminal and are thus available for subsequent monitoring and computing operations.

In the next step, the terminal initiates a "challenge and response" process, during which it generates a random number $R_1$ and transmits it to the card. Thereupon, the computer on the chipcard generates a cryptogram $e_1$, in which further data to be transferred to the terminal is encrypted together with the random number $R_1$ using the key $K_{auth}$ which employs a symmetrical key algorithm. In particular, this cryptogram includes the amount of money stored on the chipcard, so that the terminal learns the extent to which money can be withdrawn from the card. The cryptogram $e_1$ is now transmitted together with a second random number $R_2$, generated on the card, which initiates a challenge and response process in the opposite direction.

While cryptogram $e_1$ was being generated on the chipcard, the terminal, with the aid of the identification number of the card, has calculated the card-specific keys $K_{auth}$ and $K_{red}$ from the two master keys $KM_{auth}$ and $KM_{red}$, and is now able to decrypt cryptogram $e_1$. Once it knows the amount to be withdrawn, which is dependent on the input by the user at the terminal, the terminal compares this amount to the amount stored on the card and, provided the latter amount is not lower, generates a withdrawal cryptogram $e_2$ which, in addition to the amount to be debited, contains the second random number $R_2$. This cryptogram is calculated using the further key $K_{red}$, which employs a symmetrical key algorithm, and is transmitted together with a third random number $R_3$ to the chipcard. Here, it is possible in principle to use the key $K_{auth}$ once again instead of the further key $K_{red}$ and to make do without the key $K_{red}$, without any major loss of security.

In the next step, following the decryption of cryptogram $e_2$, the money is actually debited on the chipcard. For this purpose, the chipcard generates a posting (withdrawal) data record $D_B$ with the originally stored amount of money, the amount of money debited and the current amount of money, as well as with further information provided in the system, such as posting/sequence number, posting date and currency. The chipcard confirms this data record with an electronic signature, in that, using the signature function $S_{card}$ of the initially mentioned further key pair employing an asymmetrical key process, it generates an acknowledgement cryptogram $e_3$ in which the random number $R_3$ is also encrypted, in addition to the posting data record and the identification number. After the terminal has temporarily stored the verification function $V_{card}$ belonging to the $S_{card}$, it can decrypt cryptogram $e_3$ and thus verify the data record and the authenticity of the data. If no error is found, the temporarily stored identification number and verification function $V_{card}$ are deleted, and the delivery of the product or ticket or the establishment of a telephone connection dialed by the user is initiated.

In a similar manner, it is possible to secure the readout of information from a portable data carrier, e.g. a chipcard serving as an ID card. In this case, the chipcard first of all authenticates itself vis-à-vis the checking apparatus (terminal). This is accomplished using a symmetrical key process. Subsequently, the terminal transmits to the chipcard a readout command, cryptogram-secured using a symmetrical algorithm, and, together with the readout command, its authentication. The chipcard transfers the information with a digital signature generated using an asymmetrical key process.

If there is an especially great need for security and if the terminal is remote from the computer center and not connected to it, in such a case it is also possible to employ an asymmetrical key process permitting the transmission of a certificate. Usually, however, it will be sufficient to use a symmetrical key process, because in this case, there is virtually no risk of duplicates of chipcards being made by an authorized person and a third person obtaining access to a key stored in the terminal would also have to gain possession of a valid chipcard in order to be able to provide the electronic signature which, ultimately, gives the authorization associated with the ID card.

What is claimed is:

1. A system for the secure reading and modification of data on an intelligent data carrier, the data carrier storing information to be read out or modified, the system comprising:

a terminal allocated to a higher-level computer center, the terminal having an interface for providing temporary communication with the data carrier;

a first key stored on the data carrier and available to the terminal for authentication of the data carrier using a symmetrical key process;

a certificate stored on the data carrier, the certificate formed, using a global signature function, from data that is specific to the data carrier, the data that is specific to the data carrier including an individual verification function, the certificate being used for the certification of the carrier;

a first arrangement for verifying the certificate in the terminal using a global verification function stored in the terminal, the first arrangement further for temporarily storing the data specific to the data carrier in the terminal;

a second arrangement in the terminal for deriving a second key from the data specific to the data carrier and from at least one master key stored in the terminal;

a third arrangement for exchanging data between the data carrier and the terminal including a transfer of a data-modification command from the terminal to the carrier using the symmetrical key process, the symmetrical key process including a challenge and response process;

a fourth arrangement for creating and transferring to the terminal a data set, the data set documenting data to be read out from the data carrier, the data set being in the form of a cryptogram formed using an individual signature function; and a fifth device verifying the cryptogram using the individual verification function temporarily stored in the terminal, the fifth device further deleting in the terminal the temporarily stored data specific to the data carrier.

2. The system according to claim 1, wherein the data carrier is an integrated chip (IC) card.

3. The system according to claim 1, wherein the system includes a plurality of terminals, each of the plurality of terminals storing the master key, and wherein data specific to the data carrier includes an identification number, the second key being used in the symmetrical key process.

4. The system according to claim 1, wherein a further key is available on the data carrier and in the terminal, the further key being used in the symmetrical key process for authenticating the terminal in relation to the data carrier.

5. The system according to claim 4, wherein the further key is one of: i) stored on data carrier and in the terminal, and ii) derived from a stored master key using the data specific to the data carrier.

6. A process for securely reading and modifying data on an intelligent data carrier in a system including a terminal allocated to a higher-level computer center equipped with an interface for temporary communication with the data carrier, the process comprising:

transferring to the terminal a certificate stored on the data carrier, the certificate being formed, using a global signature function, from data that is specific to the data carrier, the data that is specific to the data carrier including an individual verification function, the certificate being used for certification of the data carrier;

verifying the certificate in the terminal using a global verification function stored in the terminal;

temporarily storing in the terminal the data specific to the data carrier;

deriving a first key from the data specific to the data carrier and from at least one master key stored in the terminal;

exchanging data between the data carrier and the terminal including transferring a data modification command from the terminal to the data carrier using a symmetrical key process, the first derived key and a second key stored on the data carrier being used in the symmetrical key process, the symmetrical key process including a challenge and response process;

creating and transferring to the terminal a data set, the data set documenting data to be read out from the data carrier and being in the form of a cryptogram formed by an individual signature function; and verifying the cryptogram using the individual verification function temporarily stored in the terminal; and after the verifying step, deleting in the terminal the individual data temporarily stored in the terminal.

7. The process according to claim 6, wherein the data carrier is an integrated chip (IC) card.

8. A process for securely reading data on an intelligent data carrier in a system including a terminal allocated to a higher-level computer center and equipped with interfaces for temporary communication with the data carrier, the process comprising:

transferring to the terminal a certificate stored on the data carrier, the certificate being formed, using a global signature function, from data that is specific to the data carrier, the data that is specification to the data carrier including an individual verification function, the certificate for certifying the data carrier;

verifying the certificate in the terminal using a global verification function stored in the terminal;

temporarily storing in the terminal the data that is specific to the data carrier;

deriving at least one key from the data specific to the data carrier and from at least one master key stored in the terminal;

exchanging data between the data carrier and the terminal including transferring a data-modification command from the terminal to the data carrier using a symmetrical key process, the first derived key and a second key stored on the data carrier being used in the symmetrical key process, the symmetrical key process including a challenge and response process;

creating and transferring to the terminal a data set, the data set documenting the data modification, the data set being in the form of a cryptogram formed by an individual signature function; and verifying the cryptogram using the individual verification function temporarily stored in the terminal; and after the verifying step, deleting in the terminal the temporarily stored data specific to the data carrier.

9. The process according to claim 8, wherein the data carrier is an integrated chip (IC) card.

10. The process according to claim 8, wherein the data carrier is used as an electronic purse, and wherein the data set documenting the modification includes an amount of money valid prior to the processing of the data, an amount of money debited and an amount of money valid after the processing of the data.

11. The process according to claim 8, wherein a number of data processings is consecutively counted on the data carrier, and a sequence number representing the counting result is transmitted to the terminal together with the data set documenting the modification.

12. A process for securely processing data on an intelligent data carrier in a system including a terminal allocated to a higher-level computer center and equipped with interfaces for temporary communication with the data carrier, the process comprising:

authenticating the data carrier via the terminal using a symmetrical key process, the symmetrical key processing including a challenge and response process;

transferring to the terminal selected data that is specific to and is stored on the data carrier;

transferring an additional key of an additional key pair individually allocated to the data carrier, the additional key being used for verification;

transferring a data of a data-modification command, secured by a symmetrical key process, from the terminal to the data carrier, the symmetrical key process simultaneously authenticating the terminal in relation to the data carrier;

executing the data-modification command as a function a correct authentication of the terminal;

generating and transferring a data record documenting the data modification;

determining an electronic signature using an asymmetrical key process using a first key of the additional key pair; and verifying the electronic signature and the data record by the terminal using the additional key of the additional key pair.

13. A process for securely reading data on an intelligent data carrier in a system including a terminal allocated to a higher-level computer center and equipped with interfaces for temporary communication with the data carrier, the process comprising:

transferring to the terminal selected data that is specific to the data carrier and is stored on the data carrier;

transferring a second key of an additional key pair individually allocated to the data carrier, the second key of the additional key pair being used for verification, and the data specific to the data carrier being secured by an electronic signature of the computer center using a first key of a further key pair, the first key of the further key pair being stored at a central location, the first key of the further key pair satisfying an asymmetrical algorithm, the electronic signature being verified by a second key of the further key pair, and the second key of the further key pair being stored on the data carrier;

transferring a readout command, secured by a symmetrical process, from the terminal to the data carrier, the symmetrical process including a challenge and response process, simultaneously authenticating the terminal in relation to the data carrier;

transferring data to be read, together with an electronic signature generated on the data carrier using an asymmetrical key process using a first key of the additional key pair individually allocated to the data carrier; and verifying by the terminal of the electronic signature generated on the data carrier, using the second key of the additional key pair.

14. A process for securely processing data on an intelligent terminal in a system including a terminal allocated to a higher-level computer center and equipped with interfaces for temporary communication with the data carrier, the process comprising:

transferring to the terminal selected data that is specific to the data carrier and is stored on the data carrier;

transferring a second key of an additional key pair individually allocated to the data carrier, the second key of the additional key pair being used for verification, and the data specific to the data carrier being secured by electronic signature of the computer center using a first key of a further key pair, the first key of the further key pair being stored at the central location and satisfying an asymmetrical key algorithm, the electronic signature being verified by the second key of the further key pair, and the second key of the further key pair being stored in the terminal;

transferring a data-modification command, secured by a symmetrical key process, from the terminal to the data carrier, the symmetrical key process including a challenge and response process, simultaneously authenticating the terminal in relation to the data carrier;

executing the data modification in the data carrier as a function of correct authentication of the terminal;

generating and transferring a data record documenting the data modification, together with an electronic signature generated on the data carrier using an asymmetrical key process using the first key of the additional key pair; and verifying by the terminal of the electronic signature generated on the data carrier and of the data record, using the second key of the additional key pair.

15. The process according to claim 14, wherein the data carrier is used as an electronic purse, and wherein the data record documenting the modification of data contains an amount of money valid prior to the processing of the data, an amount of money debited and an amount of money valid after the processing of the data.

16. The process according to claim 14, wherein a number of the data processings is consecutively counted on the data carrier, and a sequence number representing the counting result is transmitted to the terminal together with the data record documenting the data modification.

* * * * *